United States Patent
Lee et al.

(10) Patent No.: US 8,510,513 B2
(45) Date of Patent: Aug. 13, 2013

(54) NETWORK LOAD REDUCING METHOD AND NODE STRUCTURE FOR MULTIPROCESSOR SYSTEM WITH DISTRIBUTED MEMORY

(75) Inventors: Sang Heon Lee, Daejeon (KR); Moo Kyoung Chung, Daejeon (KR); Kyoung Seon Shin, Daejeon (KR); June Young Chang, Daejeon (KR); Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 299 days.

(21) Appl. No.: 12/970,909

(22) Filed: Dec. 16, 2010

(65) Prior Publication Data
US 2011/0153958 A1    Jun. 23, 2011

(30) Foreign Application Priority Data

Dec. 18, 2009  (KR) .................. 10-2009-0127484
Nov. 15, 2010  (KR) .................. 10-2010-0113400

(51) Int. Cl.
*G06F 12/00*  (2006.01)
*G06F 13/00*  (2006.01)
*G06F 13/28*  (2006.01)

(52) U.S. Cl.
USPC ............ 711/146; 711/118; 711/141; 711/148

(58) Field of Classification Search
USPC .................................. 711/118, 141, 146–148
See application file for complete search history.

(56) References Cited

U.S. PATENT DOCUMENTS 6,757,793 B1     6/2004 Hughes et al.
2003/0154351 A1*  8/2003 Nilsson et al. ................. 711/141

OTHER PUBLICATIONS

Acacio, Manuel, Owner Prediction for accelerating cache-to-cache transfer misses in a cc-NUMA architecture, 2002, IEEE, Available at: http://dl.acm.org/citation.cfm?id=762761.762762.*
Ravi Iyer et al., "Using Switch Directories to Speed Up Cache-to-Cache Transfers in CC-NUMA Multiprocessors", IEEE International parallel and distributed processing symposium, pp. 721~728, 2000.
Manuel E. Acacio et al., "Reducing the Latency of L2 Misses in Shared-Memory Multiprocessors through On-Chip Directory Integration", Euromicro Workshop on Parallel, Distributed and Network-based Processing, pp. 368~375, 2002.

* cited by examiner

*Primary Examiner* — Ryan Bertram
(74) *Attorney, Agent, or Firm* — Rabin & Berdo, P.C.

(57) ABSTRACT

Provided are a network load reducing method and a node structure for a multiprocessor system with a distributed memory. The network load reducing method uses a multiprocessor system including a node having a distributed memory and an auxiliary memory storing a sharer history table. The network load reducing method includes recording the history of a sharer node in the sharer history table of the auxiliary memory, requesting share data with reference to the sharer history table of the auxiliary memory, and deleting share data stored in the distributed memory and updating the sharer history table of the auxiliary memory.

14 Claims, 15 Drawing Sheets

NETWORK LOAD REDUCING METHOD AND NODE STRUCTURE FOR MULTIPROCESSOR SYSTEM WITH DISTRIBUTED MEMORY

CROSS-REFERENCE TO RELATED APPLICATIONS

This application claims the priority of Korean Patent Application Nos. 10-2009-0127484 filed on Dec. 18, 2009 and 10-2010-0113400 filed on Nov. 15, 2010, in the Korean Intellectual Property Office, the disclosures of which are incorporated herein by reference.

BACKGROUND OF THE INVENTION

1. Field of the Invention

The present invention relates to a network load reducing method and a node structure for a multiprocessor system with a distributed memory, and more particularly, to a method for reducing a data access time in a multiprocessor system with a distributed memory and a node structure for supporting the same.

2. Description of the Related Art

The recent development of semiconductor chip fabrication process technology has enabled the integration of a large amount of logic devices in a small area. However, the large amount of logic devices increases power consumption per chip. However, the increased power consumption is inconsistent with the market's requirements because mobile devices have emerged as the main application field of semiconductor system chips.

Accordingly, large-sized single-processor systems, depending on the development of process technology, are evolving into multiprocessor systems using a plurality of low-power small-sized processors.

FIG. 1 illustrates an example of a multiprocessor system with a two-dimensional mesh-based distributed memory.

Referring to FIG. 1, a multiprocessor system with a distributed memory includes a plurality of processors, switches and control devices.

The greatest problem in the implementation of the multiprocessor system is to secure the accessibility of data required by each processor. To this end, it is necessary to secure a high bandwidth for enabling the processors thereof to simultaneously access the same data storage, and it is necessary to enable two or more processors to use the same data if they access the same address region.

In the latter case, because most processors use a hierarchical memory structure, the problem is solved in the cache stage, known as a cache coherence scheme. The cache coherence scheme may be divided into a snooping-based cache coherence scheme and a directory-based cache coherence scheme.

The snooping-based cache coherence scheme is used in a bus-based multiprocessor system, which is suitable for a system that uses a small number of processors according to the bus characteristics thereof. On the other hand, the directory-based cache coherence scheme is used in a network-based multiprocessor system, which is applicable to a multiprocessor system due to its high extensibility.

When a node fails to read data stored in a cache, the directory-based cache coherence scheme causes a large amount of traffic, thus increasing the time taken to access data.

SUMMARY OF THE INVENTION

An aspect of the present invention provides a network load reducing method and a node structure for a multiprocessor system with a distributed memory, which can reduce a data access time by reducing the traffic that is generated in the event of a data request failure.

According to an aspect of the present invention, there is provided a network load reducing method using a multiprocessor system including a node having a distributed memory and an auxiliary memory storing a sharer history table, the network load reducing method including: recording the history of a sharer node in the sharer history table of the auxiliary memory; requesting share data with reference to the sharer history table of the auxiliary memory; and deleting share data stored in the distributed memory and updating the sharer history table of the auxiliary memory.

The recording of the history of a sharer node in the sharer history table of the auxiliary memory may include: determining, if a providing node of received share data is not a home node, that the providing node is the sharer node; and storing information about the sharer node and information about the share data in the sharer history table of the auxiliary memory.

The storing of the information about the sharer node and the information about the share data in the sharer history table of the auxiliary memory may include: determining whether there is free storage space available in the auxiliary memory; deleting a history thereof according to a predetermined management standard if there is no free storage space available in the auxiliary memory; and storing the information about the sharer node and the information about the share data in the sharer history table of the auxiliary memory if there is free storage space available in the auxiliary memory or if the history is deleted.

The predetermined management standard may be a first-in first-out (FIFO) scheme, a scheme of deleting information about share data in descending order of the oldness of the final search time, or a scheme of deleting information about share data in ascending order of the search frequency.

The sharing of the share data may include: searching whether the sharer history table may include information about share data to be requested from a home node; performing a first request operation of requesting the share data from the home node, if the search fails; and performing a second request operation of requesting the share data from the sharer node storing the share data, if the search is successful.

The sharer history table stored in the auxiliary memory may include share data and information about a sharer node storing the share data.

The node of the multiprocessor system may further include a directory configured to store information about the home node, and the first request operation may include: reading the address of the home node, storing the share data, from the directory; and requesting the transmission of the share data from the home node.

The deleting of the share data stored in the distributed memory may include: searching whether the sharer history table of the auxiliary memory may include information about the share data, if the use of the share data is completed; performing a first deletion operation of deleting the share data from the distributed memory, if the search fails; and performing a second deletion operation of deleting information about the share data to be deleted from the sharer history table of the auxiliary memory and deleting the share data from the distributed memory, if the search is successful.

The sharer history table stored in the auxiliary memory may include share data and information about a sharer node storing the share data, and the information about the share data to be deleted from the sharer history table of the auxiliary memory in the second deletion operation may further include information about the sharer node storing the share data.

The network load reducing method may further include: updating the sharer history table, if there is a change in the sharer node information stored in the sharer history table of the auxiliary memory.

The updating of the sharer history table may include: performing an update request operation of receiving an update request of the sharer history table of the requester node from a new sharer node storing share data; performing a history updating operation of changing information about a node storing the share data in the sharer history table to information about the new sharer node; and performing a data deleting operation of deleting the share data stored in the distributed memory.

The sharer history table stored in the auxiliary memory may include share data and information about a sharer node storing the share data, and the history updating operation may include: searching whether there is information about the share data in the sharer history table; and changing the sharer node information corresponding to the share data in the sharer history table to the new sharer node information, if the search is successful.

According to another aspect of the present invention, there is provided a node including: a processor configured to control the node and process data; a distributed memory configured to store the data processed by the processor; and an auxiliary memory configured to store a sharer history table, wherein if the node receives share data, which are requested from a first external node by the node, from a second external node, the sharer history table stores information about the second external node and information about the share data.

The node may further include a cache configured to store data that are read from the distributed memory and the first external node.

The node may further include a directory configured to store information about the first external node if the node reads data from the first external node.

The node may further include a communication unit configured to communicate data with at least one of the first external node and the second external node.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
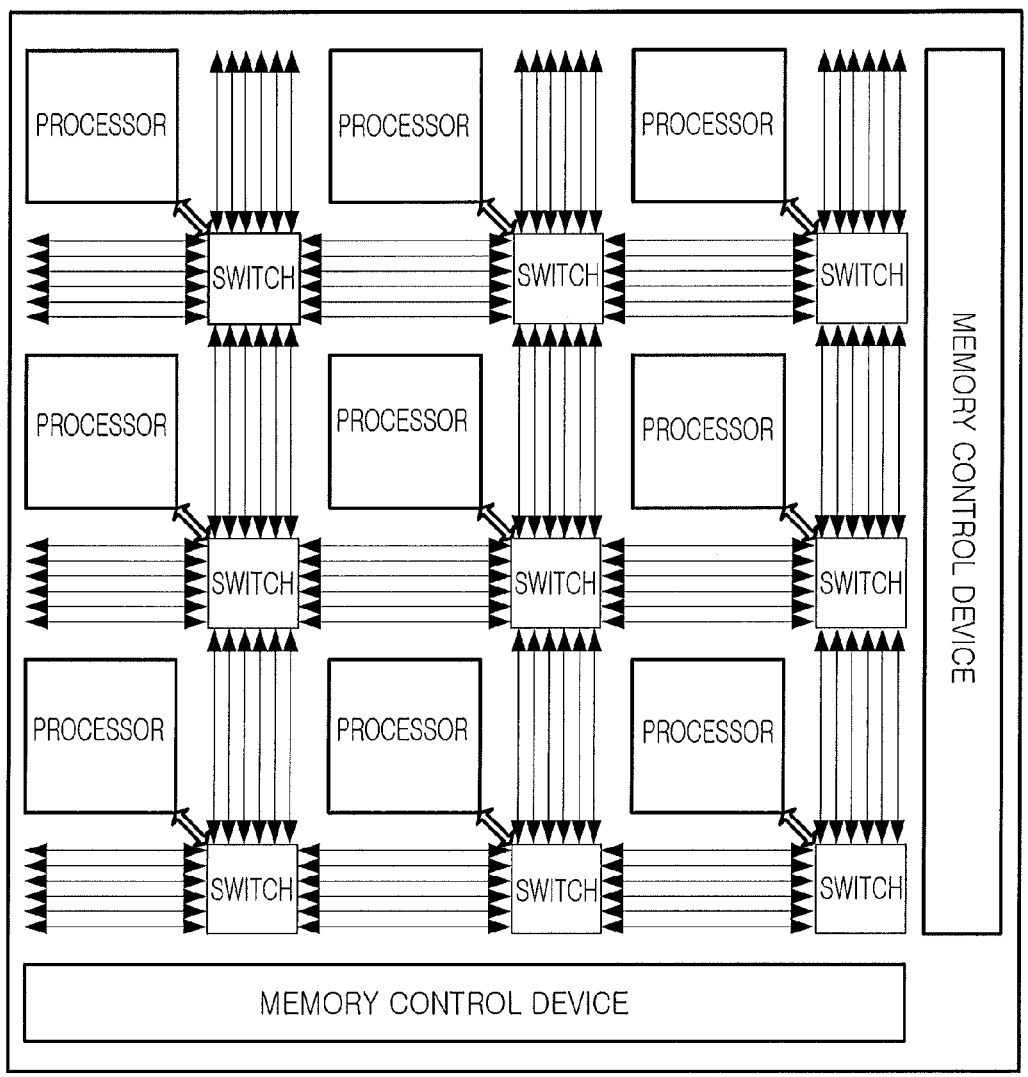
FIG. 1 illustrates an example of a two-dimensional mesh-based multimedia processor system.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the following description, detailed descriptions of well-known functions or configurations will be omitted since they would unnecessarily obscure the subject matters of the present invention.

Like reference numerals in the drawings denote like elements, and thus, their description will be omitted.

Unless otherwise specified, the terms "comprises", "includes", "comprising" and/or "including," when used in this specification, specify the presence of stated features, integers, steps, operations, elements, and/or components, but do not preclude the presence or addition of one or more other features, integers, steps, operations, elements, components, and/or groups thereof.

For a better understanding of the present invention, a conventional directory-based cache coherence system will be described first.

Figure 2:
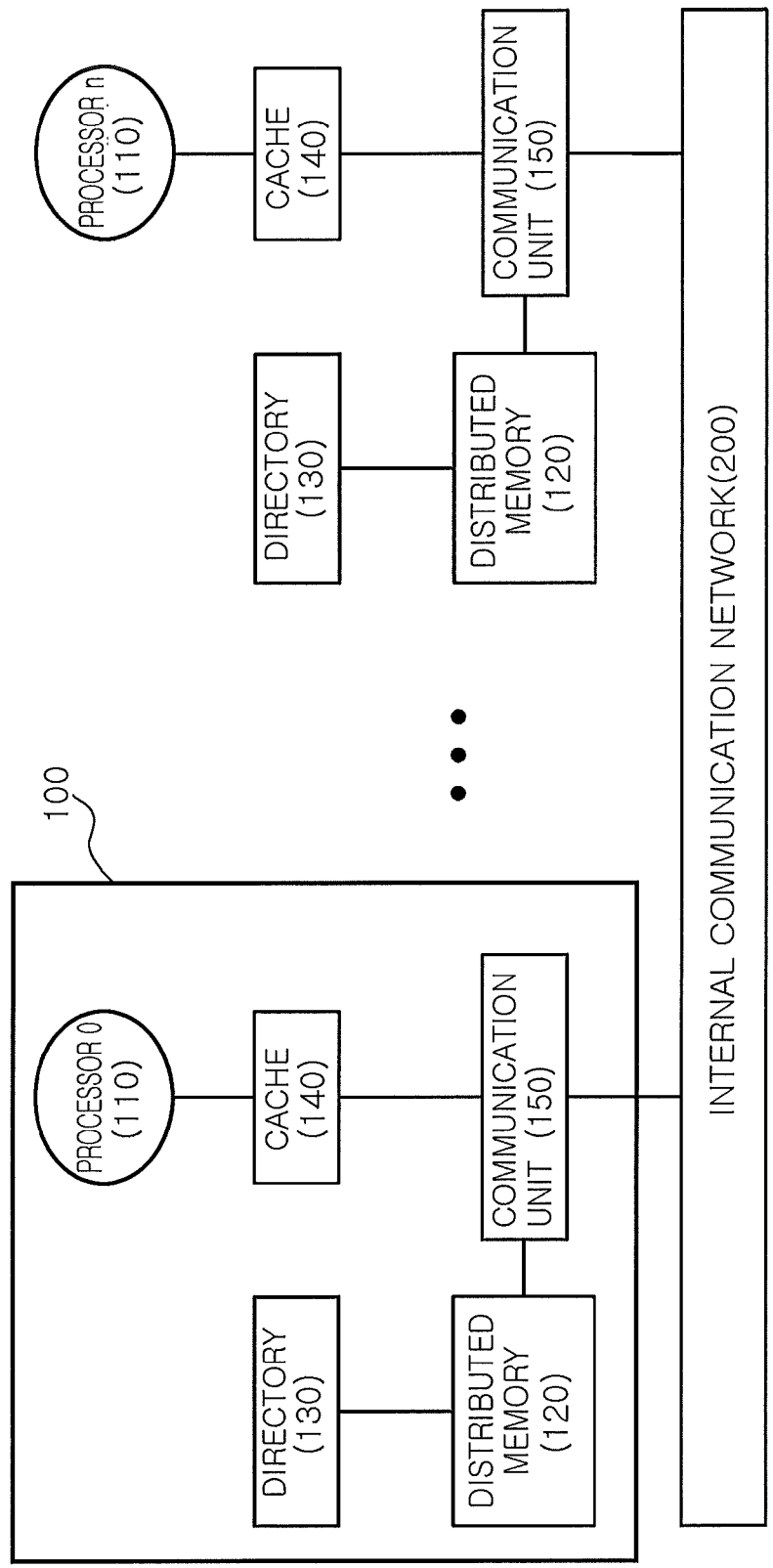
FIG. 2 is a diagram illustrating a multiprocessor system with a distributed memory based on a directory-based cache coherence system.

FIG. 2 is a diagram illustrating a multiprocessor system with a distributed memory based on a directory-based cache coherence system.

Referring to FIG. 2, a conventional multiprocessor system with a distributed memory includes a plurality of distributed processor devices 100 that are connected to an internal communication network 200 to communicate with each other. Each of the distributed processor devices 100 includes a distributed memory 120, a directory 130, a cache 140, and a communication unit 150.

The directory 130 is a kind of table that is located at each node in a multiprocessor system with a distributed memory. The table contains information about caches included in remote processor nodes that share data of a distributed memory region with each other. Thus, in order to access data, the directory 130 is accessed to search the cache 140 with valid data located therein, and the cache 140 is accessed to read the data.

A cache with valid data located therein is searched, but there may be no valid data in the cache, a situation of which is called a cache read miss. In this case, processes of searching another processor node having cache data and transmitting a data request should be performed. This generates a large amount of traffic and may delay an operation of the processor.

Figure 3:
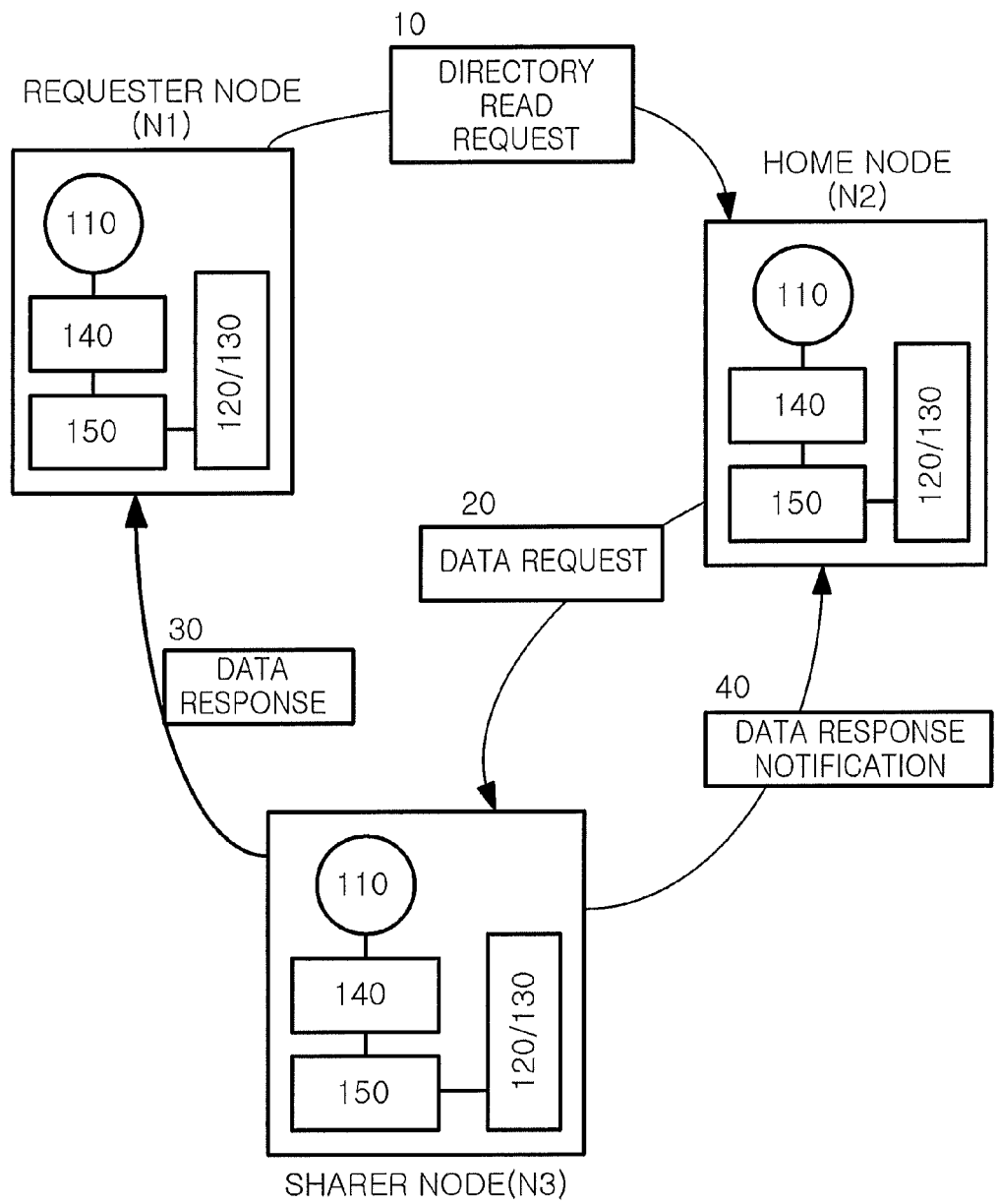
FIG. 3 is a diagram illustrating a process for generating network traffic when a cache read miss occurs in a multiprocessor system with a distributed memory based on a conventional directory-based cache coherence system.

FIG. 3 is a diagram illustrating a process for generating network traffic when a cache read miss occurs in a multiprocessor system with a distributed memory based on a conventional directory-based cache coherence system.

Referring to FIG. 3, nodes generating traffic in the event of the occurrence of a cache read miss are a requester node N1, a home node N2, and a sharer node N3. Each of the nodes N1 to N3 includes a node 100 for a multiprocessor system with a distributed memory.

In a traffic generating process, the requester node N1 transmits a directory read request 10 to the home node N2 having a distributed memory including necessary data.

When receiving the directory read request 10, the home node N2 transmits a data request 20 to the sharer node N3 having a valid value of the corresponding data, on behalf of the requester node N1.

When receiving the data request 20, the sharer node N3 transmits a data response 30 to the requester node N1 and transmits a data response notification to the home node N2.

Figure 4:
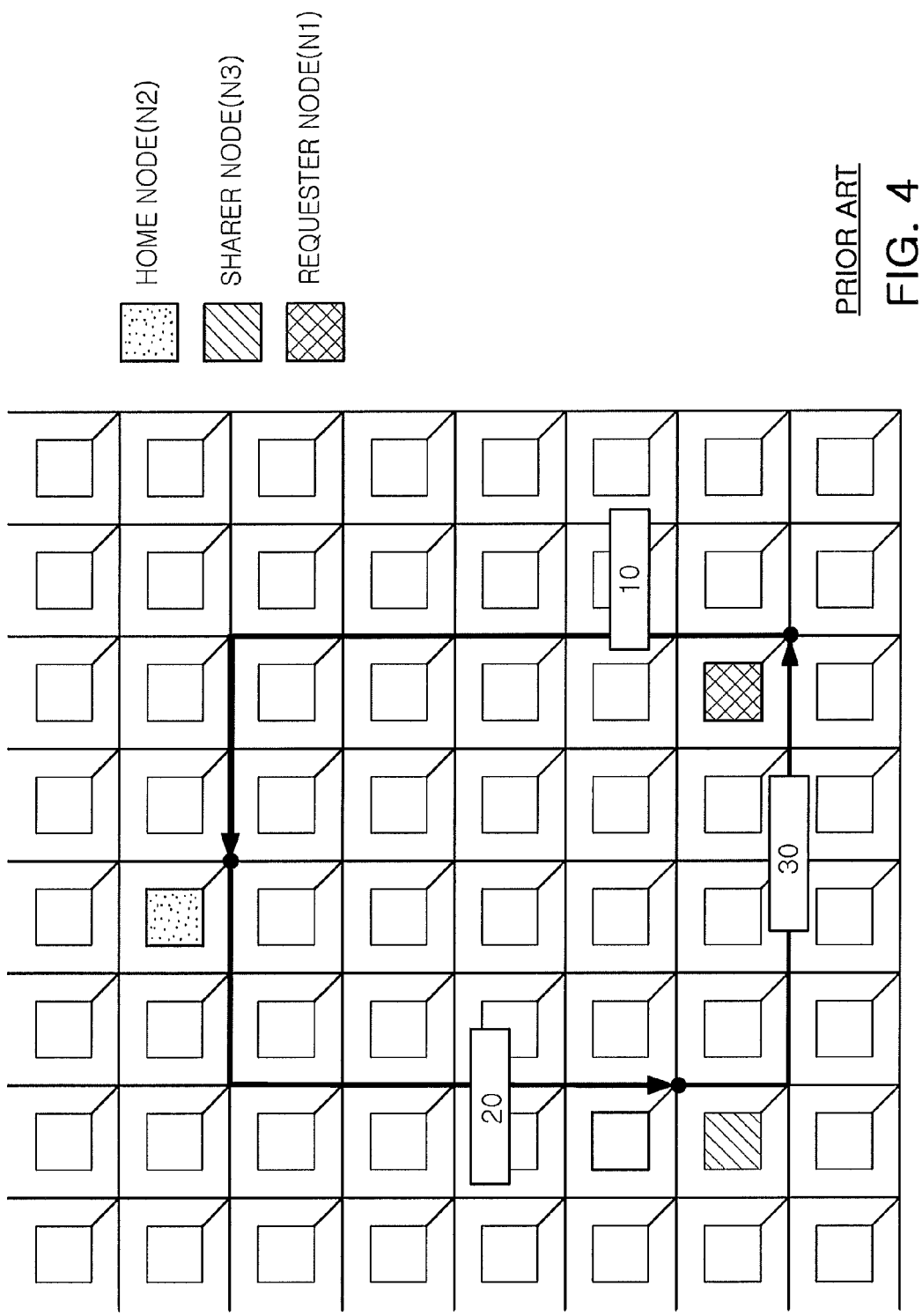
FIG. 4 is a diagram illustrating an example of the transfer path of traffic that is generated when a cache read miss occurs in a conventional directory-based cache coherence scheme.

FIG. 4 is a diagram illustrating an example of the transfer path of traffic that is generated when a cache read miss occurs in a conventional directory-based cache coherence scheme.

Referring to FIG. 4, traffic of a directory read request 10, a data request 20 and a data response 30 passes through two processor nodes and eighteen switches.

In this manner, if the home node N2 does not have a valid value of the corresponding data, a great deal of traffic should be generated so that the requester node N1 obtains data. If the requester node N1, the home node N2 and the sharer node N3 are remote from each other on the network, this causes a very long delay, thus degrading the process speed of the processor of the requester node N1 and greatly increasing the load of an internal communication network.

However, when an application program is executed on a multiprocessor system with a distributed memory, intensive data sharing occurs with respect to some address region in most cases. That is, in many cases in which a cache read miss occurs, valid data are present in the sharer node N3 rather than the home node N2.

Thus, if the sharer node N3 is accessed through the home node N2 like the conventional cache coherence scheme, much traffic is generated, thus causing a time delay.

If a cache read miss occurs and data are read from the sharer node, a history thereof is recorded in a table in the requester node N1. Thereafter, if a cache read miss occurs with respect to the same data, data are requested from the sharer node N3 without passing through the home node N2. This can greatly reduce traffic generation and time delay.

The communication between conventional processor nodes continuously uses a bypass, whereas the communication between processor nodes according to the present invention uses a direct path by history management. Thus, the present invention can reduce bandwidth use and traffic generation in the entire system. Also, the present invention can reduce communication networks and processor nodes operating in the event of the occurrence of a cache read miss, thus reducing the system power consumption.

Also, the above network load reducing method may also be applicable to a general multiprocessor system with a distributed memory.

In order to realize the above solution method, a node structure of a multiprocessor system with a distributed memory according to the present invention may further include a small-capacity auxiliary memory.

Figure 5:
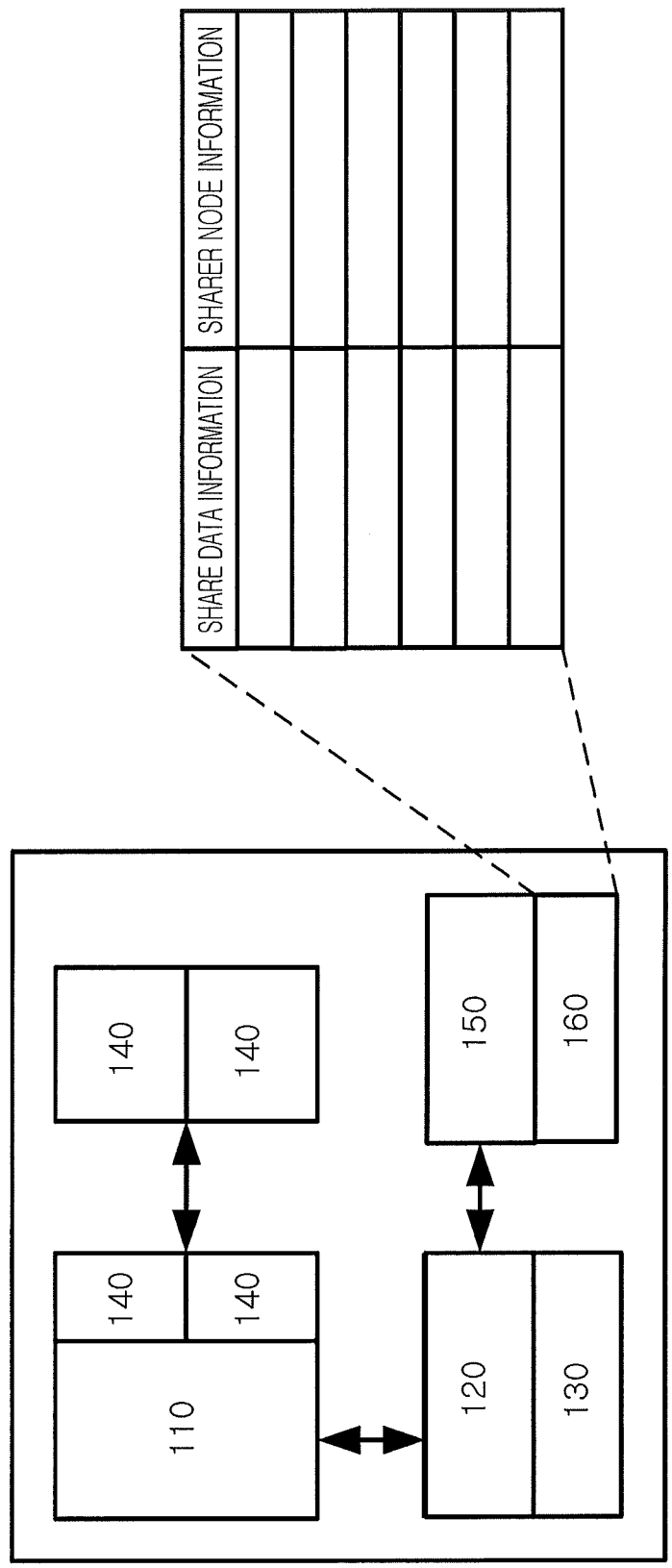
FIG. 5 is a configuration diagram of a node for a multiprocessor system with a distributed memory according to an exemplary embodiment of the present invention.

FIG. 5 is a configuration diagram of a node for a multiprocessor system with a distributed memory according to an exemplary embodiment of the present invention.

Referring to FIG. 5, a node 100 according to an exemplary embodiment of the present invention may include a distributed memory 120 and an auxiliary memory 160 storing a sharer history table. The node 100 may further include a communication unit 150 and a processor 110. Also, the node 100 may further include a directory 130 and a cache 140 for application to a directory-based cache coherence system.

The processor 110, the distributed memory 120, the directory 130 and the communication unit 150 are identical to those of the conventional art, and thus a detailed description thereof will be omitted in the interests of conciseness.

The auxiliary memory 160 storing a sharer history table has a smaller capacity than the distributed memory 120.

In the cache coherence system, the sharer history table may include an address of a data block with a cache read miss and an address of a sharer node N3 provided with the corresponding data.

The sharer history table of the auxiliary memory 160 has only to store only a few records. Therefore, the present invention has only to add only small hardware resources to the conventional distributed processor system.

Hereinafter, a description will be given of a method for reducing network load by applying the node to a directory-based cache coherence system according to an exemplary embodiment of the present invention.

First, a description will be given of a method for the node 100 to manage an address of data with a cache read miss, stored in the sharer history table, and an address of the sharer node N3.

If a cache read miss occurs with respect to data that are not stored in the sharer history table of the auxiliary memory 160, an address of the corresponding data and an address of the sharer node N3 provided with the data are stored in the sharer history table of the auxiliary memory 160 to record a history thereof.

When the requester node N1 deletes share data from the distributed memory, if the share data are data with an address stored in the sharer history table of the auxiliary memory 160, an address of the corresponding data and a history of the sharer node N3 provided with the data are deleted from the sharer history table of the auxiliary memory 160.

If a third sharer is generated during the use of the corresponding data in the cache by the requester node N1, the sharer history table of the auxiliary memory 160 is updated. When an invalidation signal 50 is received from the third sharer, the corresponding data are deleted from the cache and the sharer history table of the auxiliary memory 160 is updated to an address of a new sharer node. This is to store information about the sharer node N3, which stores valid data, in the sharer history table of the auxiliary memory 160.

If a cache read miss occurs but the sharer history table of the auxiliary memory 160 is full, free space is secured by deleting the oldest history and the newest history is stored therein.

Figure 6:
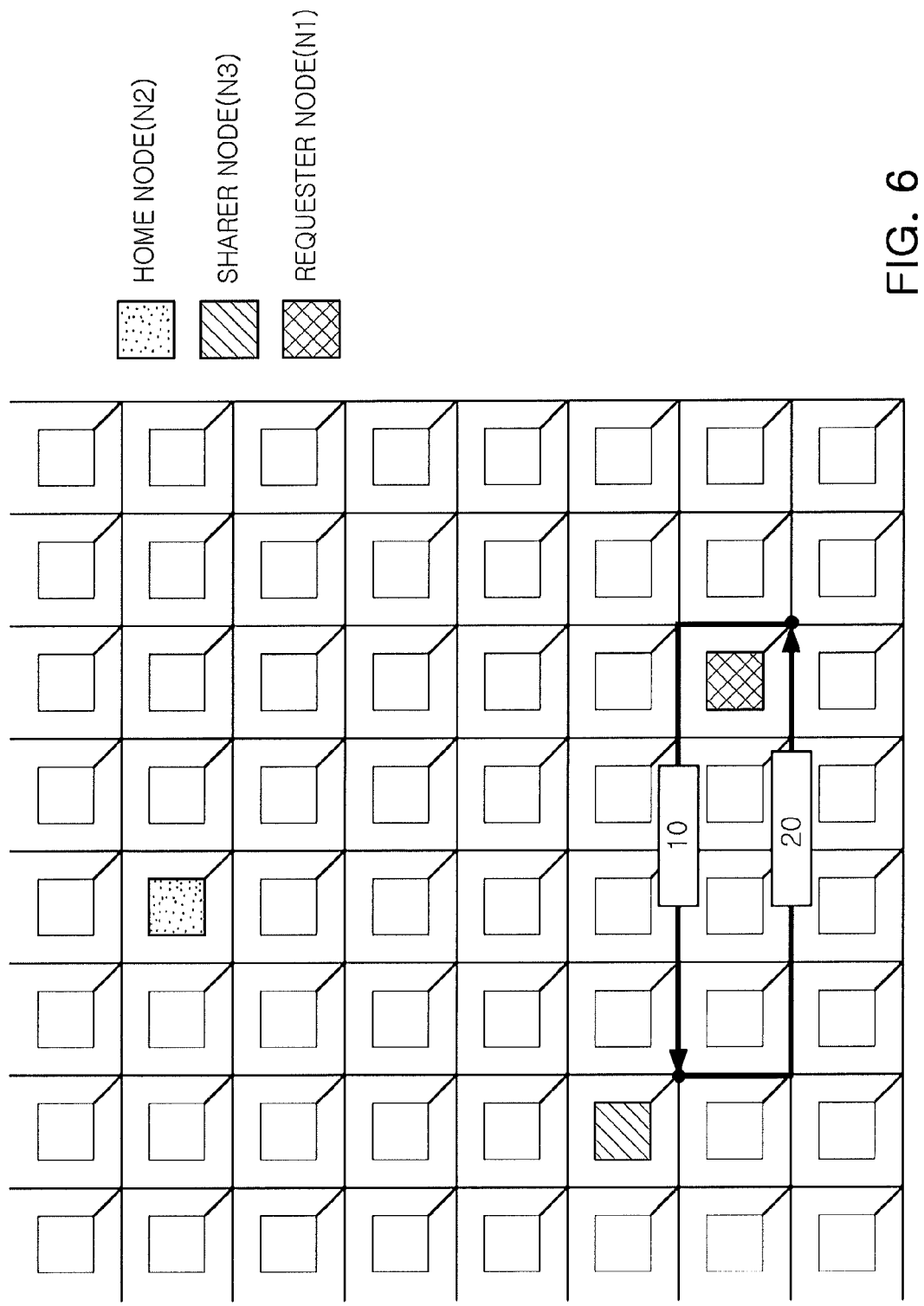
FIG. 6 is a diagram illustrating an example of a traffic flow when a cache read miss occurs if a node for a multiprocessor system with a distributed memory is applied to a directory-based cache coherence system, according to an exemplary embodiment of the present invention.

FIG. 6 is a diagram illustrating an example of a traffic flow when a cache read miss occurs if a node for a multiprocessor system with a distributed memory is applied to a directory-based cache coherence system, according to an exemplary embodiment of the present invention.

Referring to FIG. 6, a traffic flow in a case in which data with a cache read miss are data with a history stored in the sharer history table of the auxiliary memory 160 is illustrated.

The requester node N1 directly transmits a data request 10 to the sharer node N3. In response to the data request 10, the sharer node N3 transmits a data response 20 to the requester node N1. In this case, the traffic flow according to the present invention passes through one processor node and ten switches. Thus, it can be seen that the present invention can reduce the number of processor nodes and switches used, as compared to the traffic flow of FIG. 4.

Thus, the present invention can reduce traffic, data access time delay and power consumption.

Figure 7:
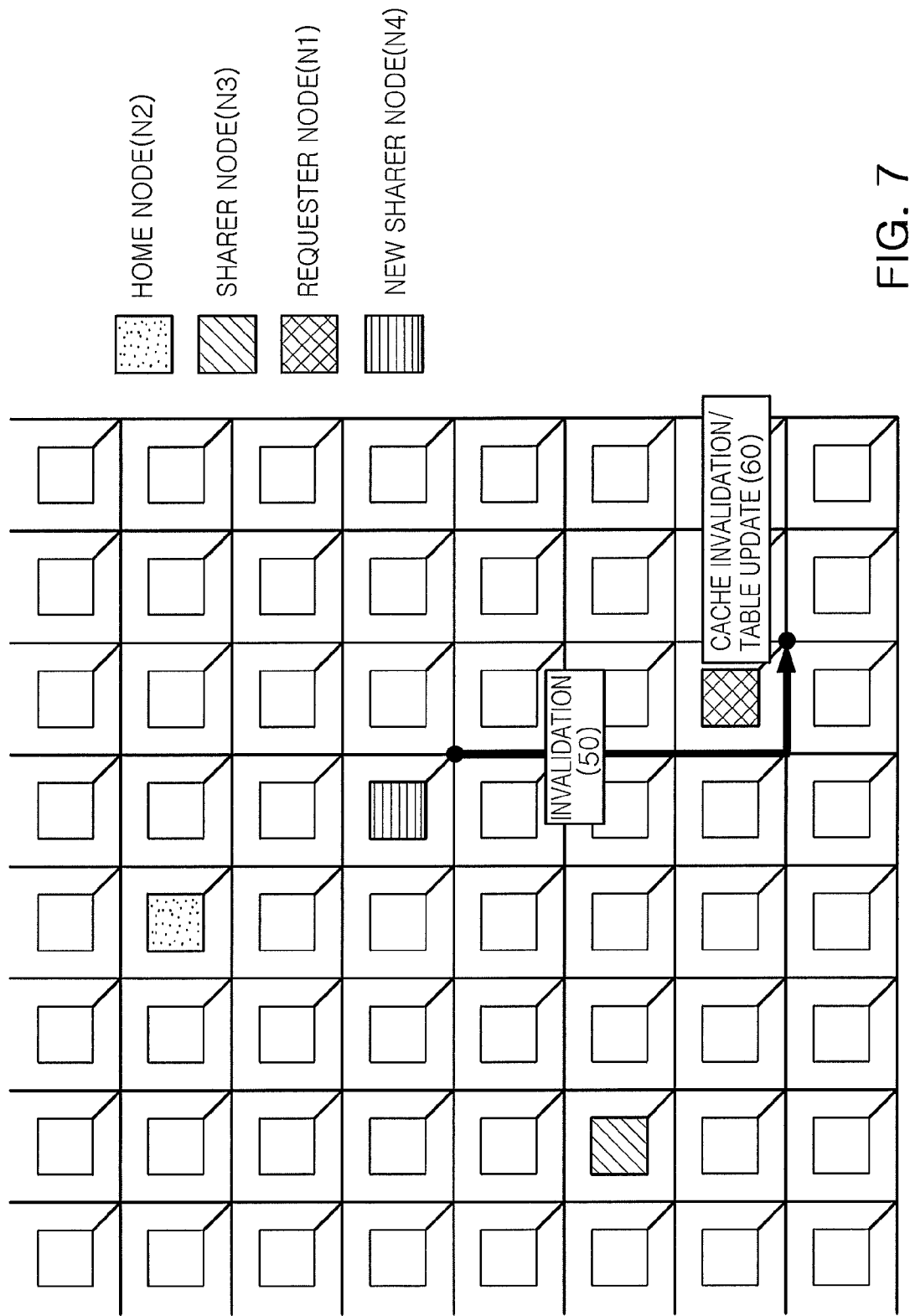
FIG. 7 is a diagram illustrating an example of a traffic flow when there is a new sharer, if a node for a multiprocessor system with a distributed memory is applied to a directory-based cache coherence system, according to an exemplary embodiment of the present invention.

FIG. 7 is a diagram illustrating an example of a traffic flow when there is a new sharer if a node for a multiprocessor system with a distributed memory is applied to a directory-based cache coherence system, according to an exemplary embodiment of the present invention.

According to the directory protocol, a new sharer N4 transmits an invalidation signal (50) to all nodes using the corresponding data. When receiving the invalidation signal 50, the requester node N1 deletes used data from the cache and updates (60) the sharer history table of the auxiliary memory 160 to a new sharer address.

FIGS. 8A to 8D are flow diagrams illustrating a network load reducing method for a multiprocessor system with a distributed memory according to an exemplary embodiment of the present invention.

A network load reducing method for a multiprocessor system with a distributed memory according to an exemplary embodiment of the present invention is a network load reducing method using a multiprocessor system including a node 100 including a distributed memory 120 and an auxiliary memory 160 storing a sharer history table.

The multiprocessor system may include four nodes: a requester node N1 requesting the transmission of share data, a home node N2/a sharer node N3 transmitting the requested share data, and a new sharer node N4 sharing share data on behalf of the sharer node N3. The sharer node N3 transmits share data to the requester node N1 if the share data are not present in the home node N2 from which the share data are requested.

A physical node 100 may be any one of the nodes N1 to N4.

Share data and information about the sharer node storing the share data are recorded in the sharer history table stored in the auxiliary memory 160.

The network load reducing method according to the present invention may include a share data sharing process S100, a share data deleting process S200, and a history recording process S300. The network load reducing method according to the present invention may further include a history updating process S400.

The requester node N1 records the sharer history table in the auxiliary memory 160 through the history recording process S100. By using the recorded sharer history, the requester node N1 may request share data from the sharer node N3 without requesting share data from the home node N2 when requesting share data in the next session. Accordingly, the multiprocessor system with a distributed memory can reduce traffic, thus reducing the network load thereof.

Figure 8A:
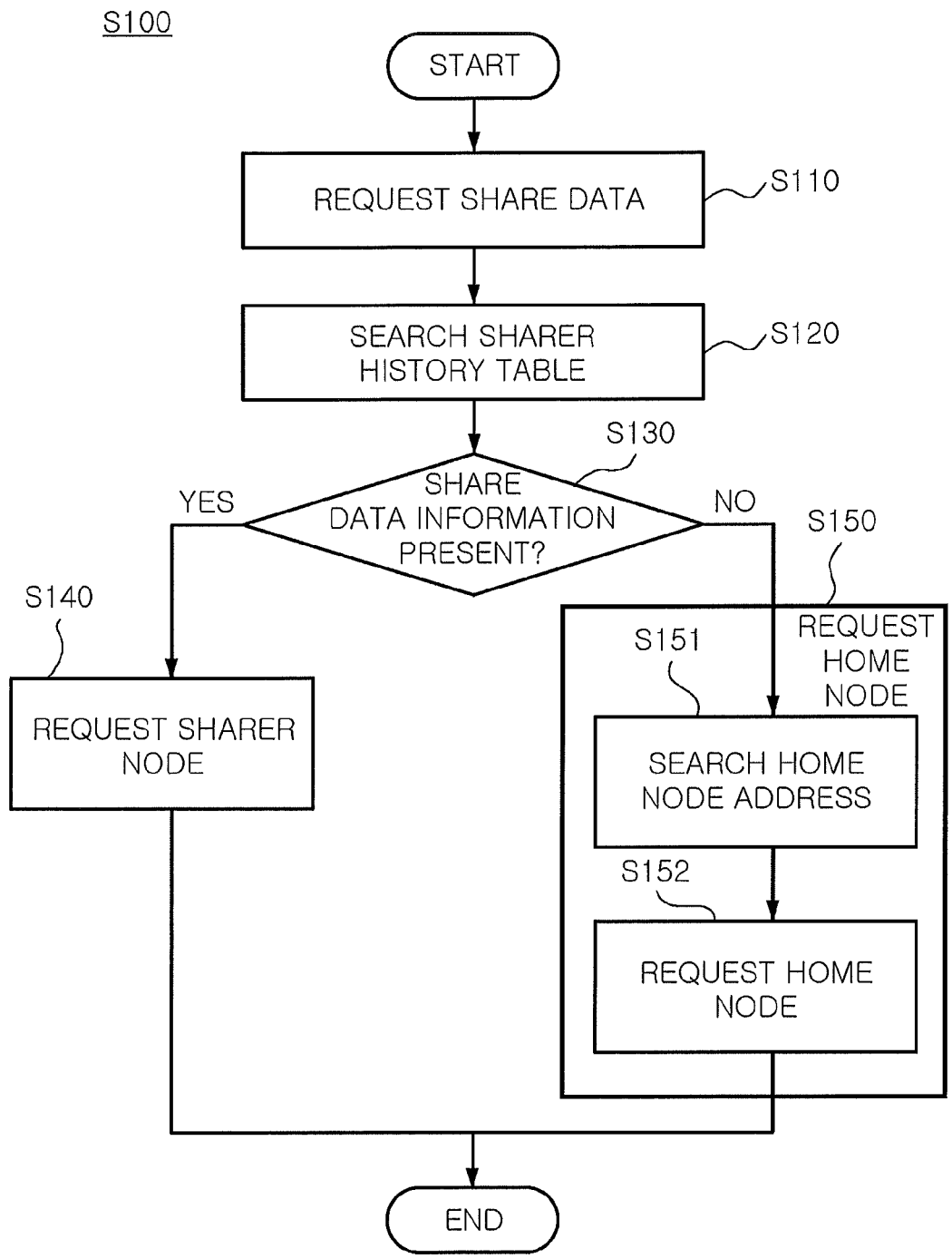
FIGS. 8A to 8D are flow diagrams illustrating a network load reducing method for a multiprocessor system with a distributed memory according to an exemplary embodiment of the present invention.

FIG. 8A is a flow diagram illustrating a history storing process using a sharer history table stored in an auxiliary memory, in a network load reducing method for a multiprocessor system with a distributed memory according to an exemplary embodiment of the present invention.

Referring to FIG. 8A, the share data sharing process S100 of the network load reducing method according to the present invention includes a share data requesting operation S110, a sharer history table searching operation S120, a share data information presence/absence determining operation S130, a sharer node request operation S140, and a home node request operation S150.

In the share data requesting operation S110, it is determined whether data to be used by the requester node N1 are share data shared by other nodes (N2 and N3) or data stored in the distributed memory of the requester node N1. If the data to be used by the requester node N1 are share data shared by other nodes (N2 and N3), the requester node N1 determines to request share data.

In the sharer history table searching operation S120, it is determined whether information about the share data is present in the sharer history table stored in the auxiliary memory 160.

In the sharer node request operation S140, if there is no information about share data (S130), the requester node N1 transmits a share data transmission request to the sharer node N3 with reference to the sharer history table on behalf of the home node N2.

In the home node request operation S150, if there is no information about share data in the sharer history table (S130), a share data transmission request is transmitted to the home node N2 through an operation S151 of searching an address of the home node N2 and an operation S152 of transmitting a share data transmission request to the home node N2. Although not illustrated, a storage unit storing a table containing an address of the home node N2, for example, a directory may be further included in the requester node N1.

Through the share data sharing process S100 of the network load reducing method, the requester node N1 can detect the absence of the share data in the home node N2 prior to transmission of the request to the home node N2, and can directly transmit the share data transmission request to the sharer node N3 storing the share data. Accordingly, the traffic for the share data request can be reduced, thus reducing the network load.

Figure 8B:
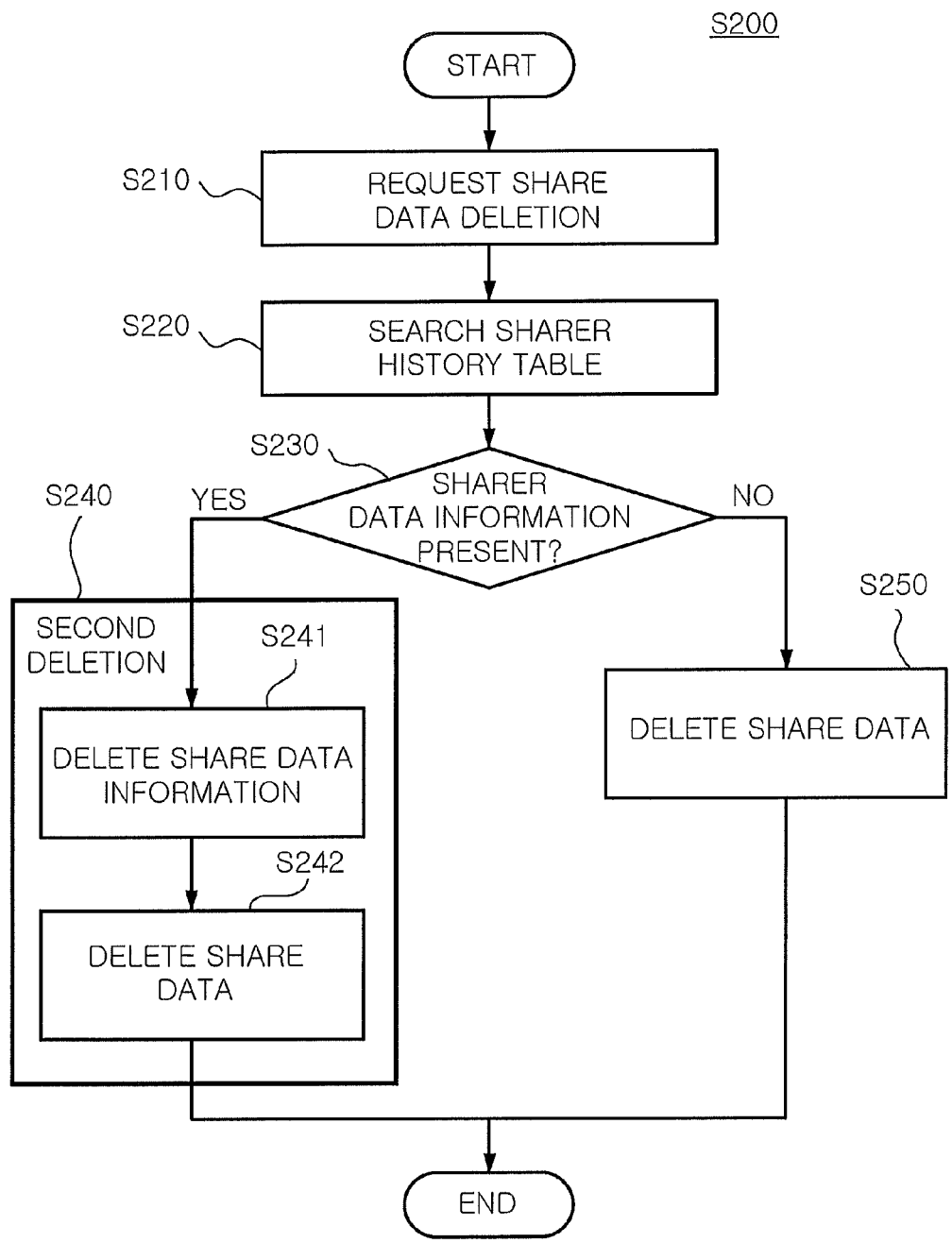

FIG. 8B is a flow diagram illustrating a share data deleting process using a sharer history table stored in an auxiliary memory, in a network load reducing method for a multiprocessor system with a distributed memory according to an exemplary embodiment of the present invention.

Referring to FIG. 8B, the share data deleting process S200 of the network load reducing method according to the present invention may include a share data deletion requesting operation S210, a sharer history table searching operation S220, a share data information presence/absence determining operation S230, a first deletion operation S250, and a second deletion operation S240.

In the share data deletion requesting operation S210, the deletion of data stored in the distributed memory 120 may be prepared. In the share data deletion requesting operation S210, if the data to be deleted are share data shared with other nodes, the subsequent operations for deletion of the share data may be performed.

In the sharer history table searching operation S220, it is determined whether information about the share data, equal to the share data to be deleted, is present in the sharer history table stored in the auxiliary memory 160.

In the first deletion operation S250, if there is no information about the share data equal to the share data to be deleted (S230), the deletion-requested share data are deleted from the distributed memory 120.

In the second deletion operation S240, if there is information about the share data equal to the share data to be deleted (S230), information about the share data is deleted from the sharer history table (S241) and the deletion-requested share data are deleted from the distributed memory 120 (S242).

Through the share data deleting process S200 of the network load reducing method, the requester node N1 deletes a history of the share data when deleting the share data used, thus securing a free space in the auxiliary memory 160. Also, the size of data stored in the auxiliary memory 160 can be reduced, thus improving the search speed of the sharer history table stored in the auxiliary memory 160.

Figure 8C:
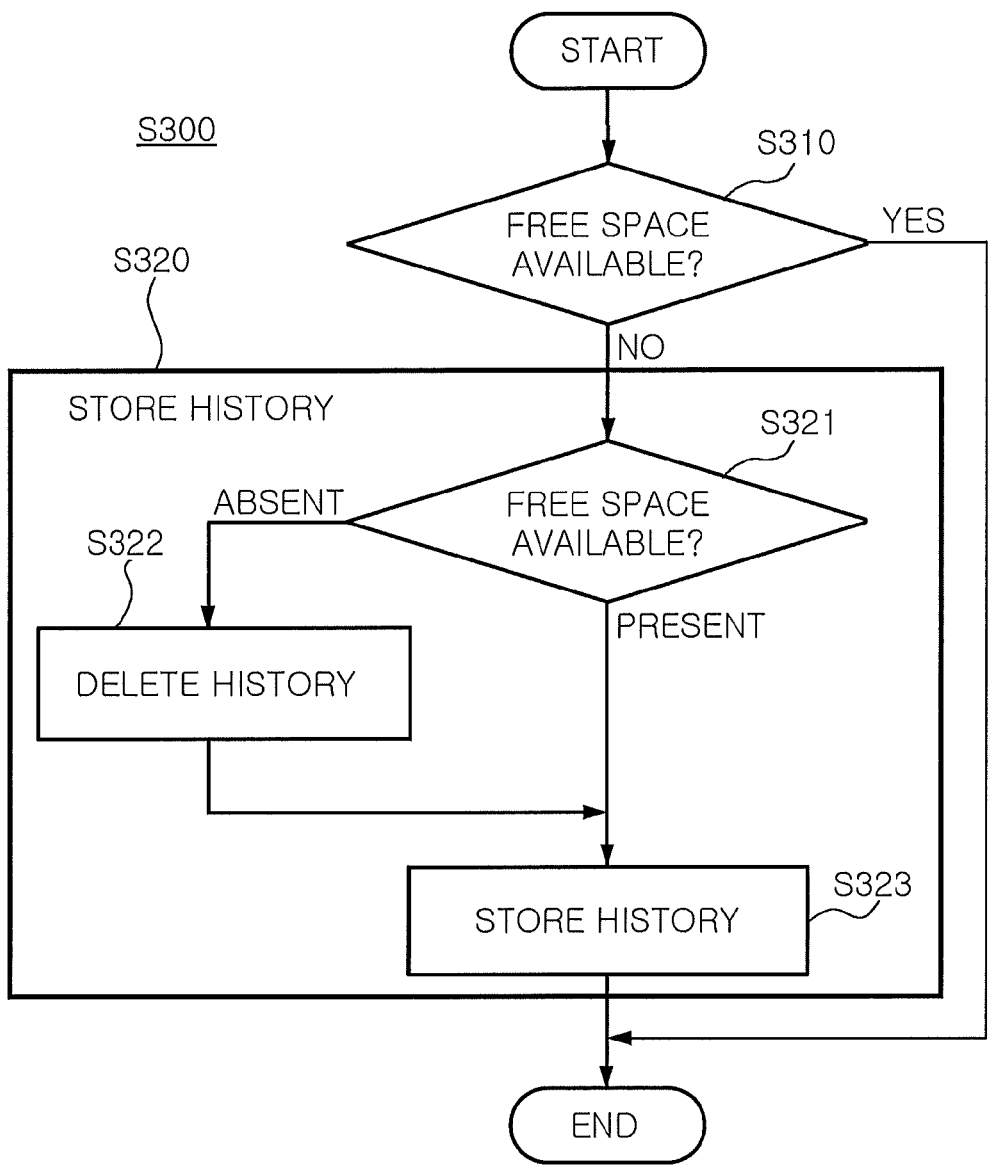

FIG. 8C is a flow diagram illustrating a history recording process using a sharer history table stored in an auxiliary memory, in a network load reducing method for a multiprocessor system with a distributed memory according to an exemplary embodiment of the present invention.

Referring to FIG. 8C, the history recording process S300 of the network load reducing method according to the present invention may include a miss occurrence/nonoccurrence determining operation S310 and a history storing operation S320.

In the miss occurrence/nonoccurrence determining operation S310, the requester node N1 may determine whether a read miss has occurred, by detecting whether the requester node N1 has received the share data, requested from the home node N2, from the sharer node N3. If the node N3 transmitting the share data is not identical to the home node N2, a read miss occurs. Thus, a data transmission request is transmitted from the home node N2 to the sharer node N3, and the share data are transmitted to the requester node N1. If the transmission of the share data is requested from the home node N2, the sharer node N3 continuously receives the share data. Therefore, it can be determined through the miss occurrence/nonoccurrence determining operation S310 that much traffic may be generated.

In the history storing operation S320, information about the sharer node N3 and information about the share data are stored in the sharer history table of the auxiliary memory 160 of the requester node N3. Also, the history storing operation S320 may include a free space checking operation S321, a history deleting operation S322, and a history storing operation S323.

In the free space checking operation S321, it is checked whether free storage space for sharer history storage is present in the auxiliary memory 160.

In the history deleting operation S322, the history is deleted according to a predetermined management standard, if free storage space for sharer history storage is not present in the auxiliary memory 160.

In the history storing operation S323, information about the sharer node N3 and information about the share data are stored in the sharer history table of the auxiliary memory 160, if free storage space for sharer history storage is not present in the auxiliary memory 160 or if the history deleting operation is performed.

The predetermined management standard may be a first-in first-out (FIFO) scheme or a scheme of deleting information about share data in ascending order of the search frequency.

Through the history recording process S300 of the network load reducing method, the requester node N1 can detect with reference to the sharer history table of the auxiliary memory 160 that there is no share data in the home node N2 and can directly transmit a share data request to the sharer node N3 storing the share data. Accordingly, the traffic for a share data request can be reduced, thus reducing the network load.

Figure 8D:
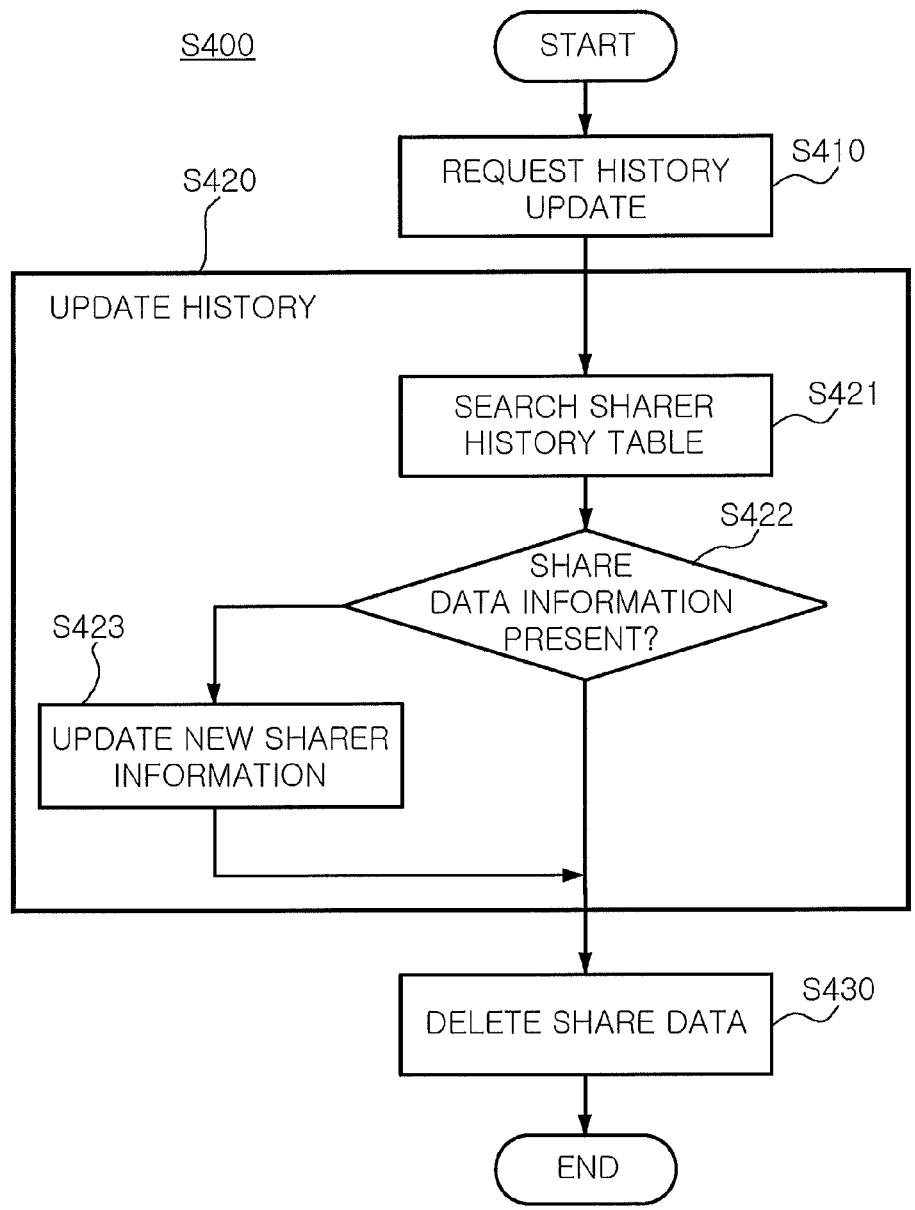

FIG. 8D is a flow diagram illustrating a history updating process using a sharer history table stored in an auxiliary memory, in a network load reducing method for a multiprocessor system with a distributed memory according to an exemplary embodiment of the present invention.

Referring to FIG. 8D, the history updating process S400 of the network load reducing method according to the present invention may include a history update requesting operation S410, a history updating operation S420, and a share data deleting operation S430. Herein, the history updating operation S420 may include a sharer history table searching operation S421, a share data information presence/absence determining operation S422, and a new sharer information updating operation S423.

The sharer history table stored in the auxiliary memory 160 may include share data and information about the sharer node N3 storing the share data.

In the history update requesting operation S410, when an invalidation request is received from the new sharer node N4, the updating of the sharer history table stored in the auxiliary memory 160 may be requested. That is, because the old sharer node N3 does not share data any more and the new sharer node N4 shares the data, information about the sharer node is updated.

In the history updating operation S420, the requester node N3 changes information about the node, which stores the share data in the sharer history table, to information about the new sharer node N4.

In the sharer history table searching operation S421, it is determined whether information about the share data is stored in the sharer history table.

In the new sharer information updating operation S423, if the search is successful (S422), information about the sharer node N3 corresponding to the share data in the sharer history table is changed to information about the new sharer node N4.

In the share data deleting operation S430, old share data (i.e., invalid data) are deleted and share data are received from the new sharer node N4 if necessary.

FIGS. 9A to 9D are flow diagrams illustrating a method for using/managing a sharer history table stored in an auxiliary memory, when a network load reducing method for a multiprocessor system with a distributed memory is applied to a directory-based cache coherence system, according to an exemplary embodiment of the present invention.

Figure 9A:
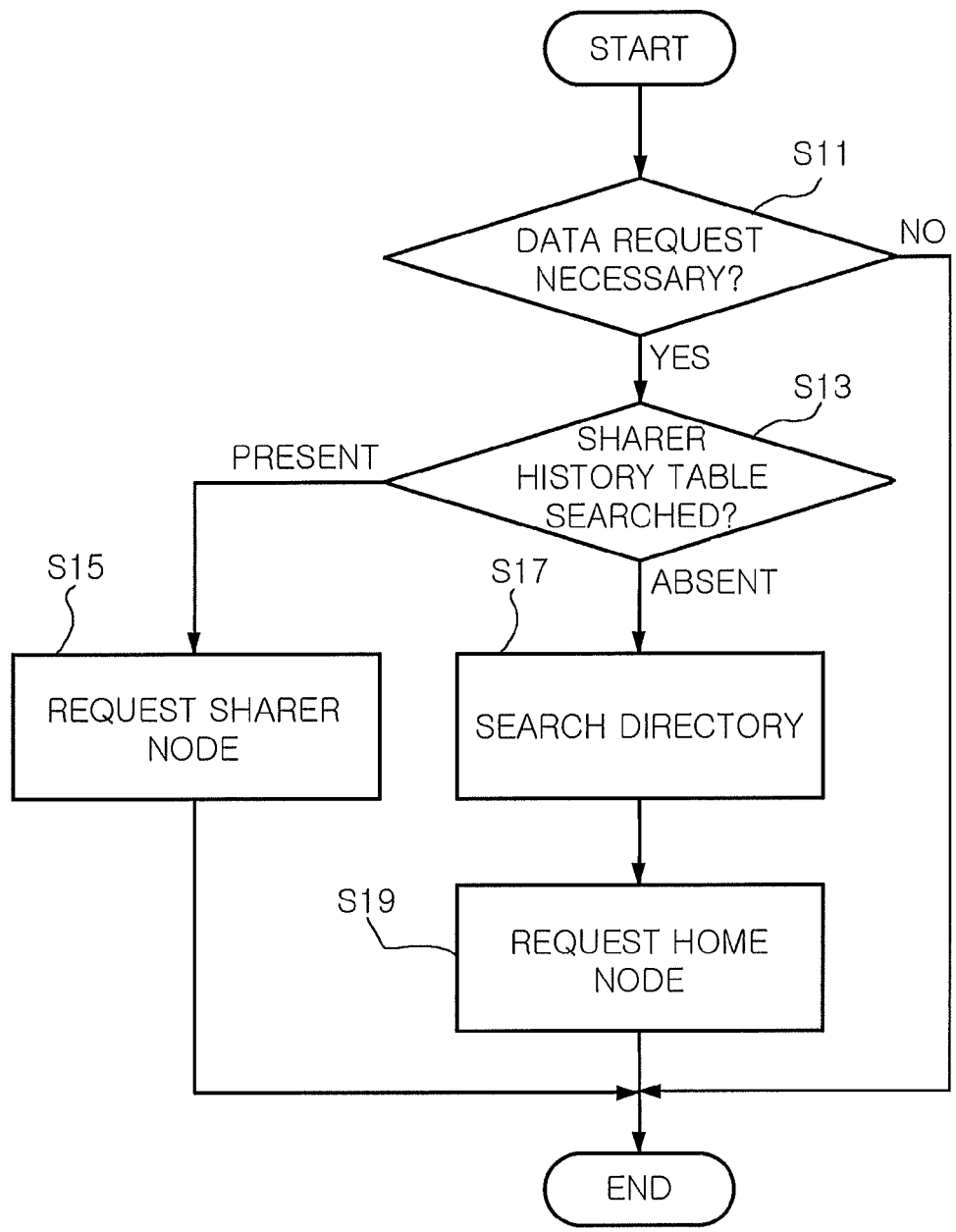
FIGS. 9A to 9D are flow diagrams illustrating a method for using/managing a sharer history table stored in an auxiliary memory, when a network load reducing method for a multiprocessor system with a distributed memory is applied to a directory-based cache coherence system, according to an exemplary embodiment of the present invention.

Referring to FIG. 9A, the share data sharing process S100 according to the present invention may include a share data requesting operation S10, a data request determining operation S11, a sharer history table searching operation S13, a sharer node request operation S15, a directory searching operation S17, and a home node request operation S19.

The requester node N1 and the home node N2 or the requester node N1 and the sharer node N3 are nodes sharing share data with each other.

In the data request determining operation S11, it is determined whether data to be used are stored in the distributed memory 120 of the requester node N1, and a share data request is transmitted to an external node (N2 or N3), if the data are not present in the distributed memory 120.

In the sharer history table searching operation S13, it is determined whether share data are data stored in the sharer history table of the auxiliary memory 160, and address information of the sharer node N3 is read from the sharer history table of the auxiliary memory 160, if the share data are data stored in the sharer history table of the auxiliary memory 160.

In the sharer node request operation S15, a share data request is transmitted to the address of the sharer node N3 read from the sharer history table of the auxiliary memory 160 (10).

In the directory searching operation S17, if the history is not stored in the sharer history table of the auxiliary memory 160, cache information of the home node N2 storing the share data is read from the directory.

In the home node request operation S19, a directory read request (10) is transmitted to the home node N2.

The network load reducing method of the present invention may be modified according to the structure of the multiprocessor system with a distributed memory.

Figure 9B:
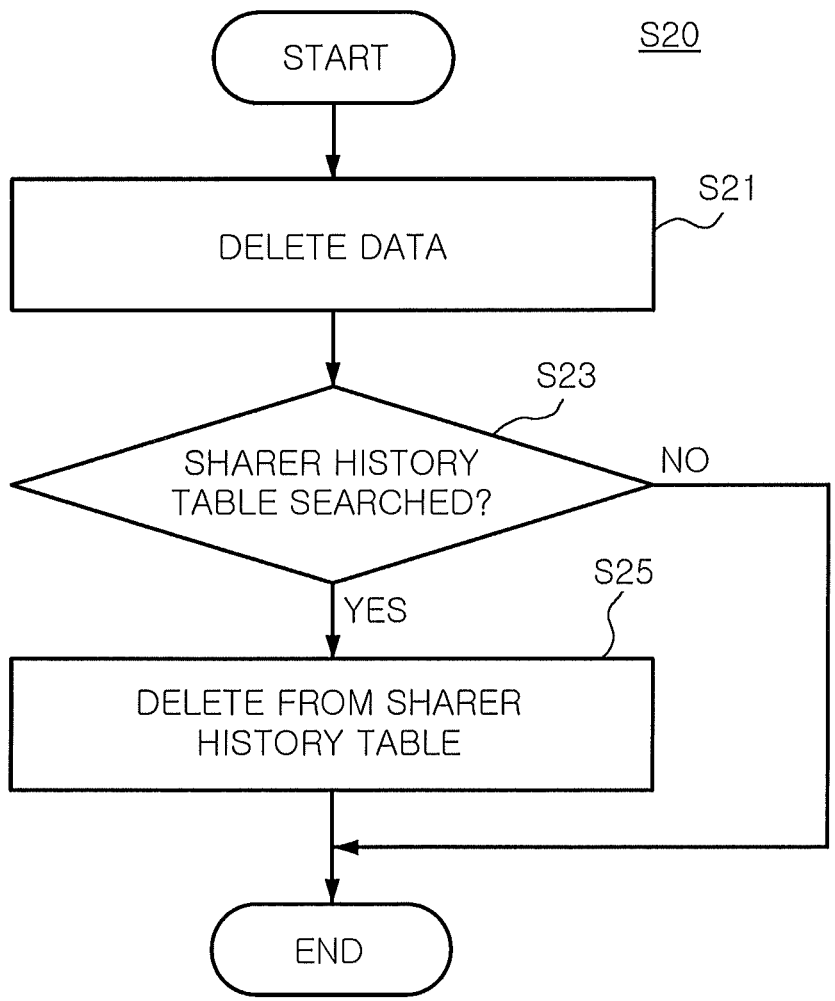

Referring to FIG. 9B, a history deleting process S20 of the sharer history table in the cache coherence scheme according to the present invention may include a data deleting operation S21, a sharer history table searching operation S23, and a deletion operation S25 from the sharer history table.

In the data deleting operation S21, data use is terminated, corresponding data stored in the cache or the memory are deleted, and information about the corresponding data is deleted from the sharer history table.

In the sharer history table searching operation S23, it is determined whether the deleted data are the data stored in the sharer history table.

In the deletion operation S25 from the sharer history table, the history of the corresponding data stored in the sharer history table is deleted, if it is determined that the deleted data are the data stored in the sharer history table (S23).

Figure 9C:
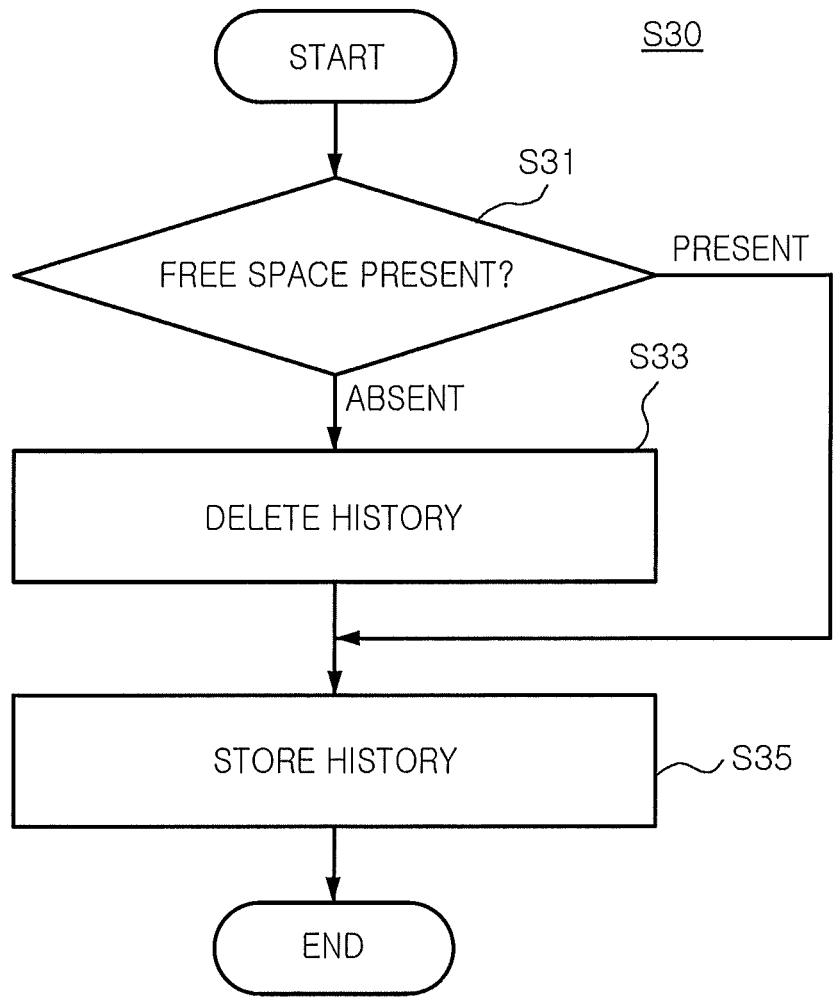

Also, as illustrated in FIG. 8B, the sharer history table searching operation S23 may be first performed, and the data deleting operation S21 may be performed after the deletion operation S25 from the sharer history table Referring to FIG. 9C, a history recording process S30 of the sharer history table in the cache coherence scheme according to the present invention may include a free space checking operation S31, a history deleting operation S33 according to a management standard, and a history storing operation S35.

If a data response is received from the sharer node N3 due to the occurrence of a cache read miss, the corresponding data and the address of the sharer node N3 are stored in the sharer history table.

In the free space checking operation S31, it is checked whether the sharer history table has a space for adding a new history. The storing of many histories in the sharer history table is difficult because it is configured using a small-capacity memory. If the sharer history table does not have a space for adding a new history, the history deleting operation S33 is performed according to the management standard. The history storing operation S35 is performed if the sharer history table has a space for adding a new history.

The history deleting operation S33 according to the management standard, the history is deleted according to a predetermined management standard to secure a space for storing a new history. The predetermined management standard may be a scheme of deleting the data history in descending order of the oldness of storage, a scheme of deleting the data history in descending order of the oldness of search, or a scheme of deleting the data history in ascending order of the search frequency.

In the history storing operation S35, a cache read miss may occur, and the address of the corresponding data and the address of the corresponding sharer node N3 are stored in the free space.

Figure 9D:
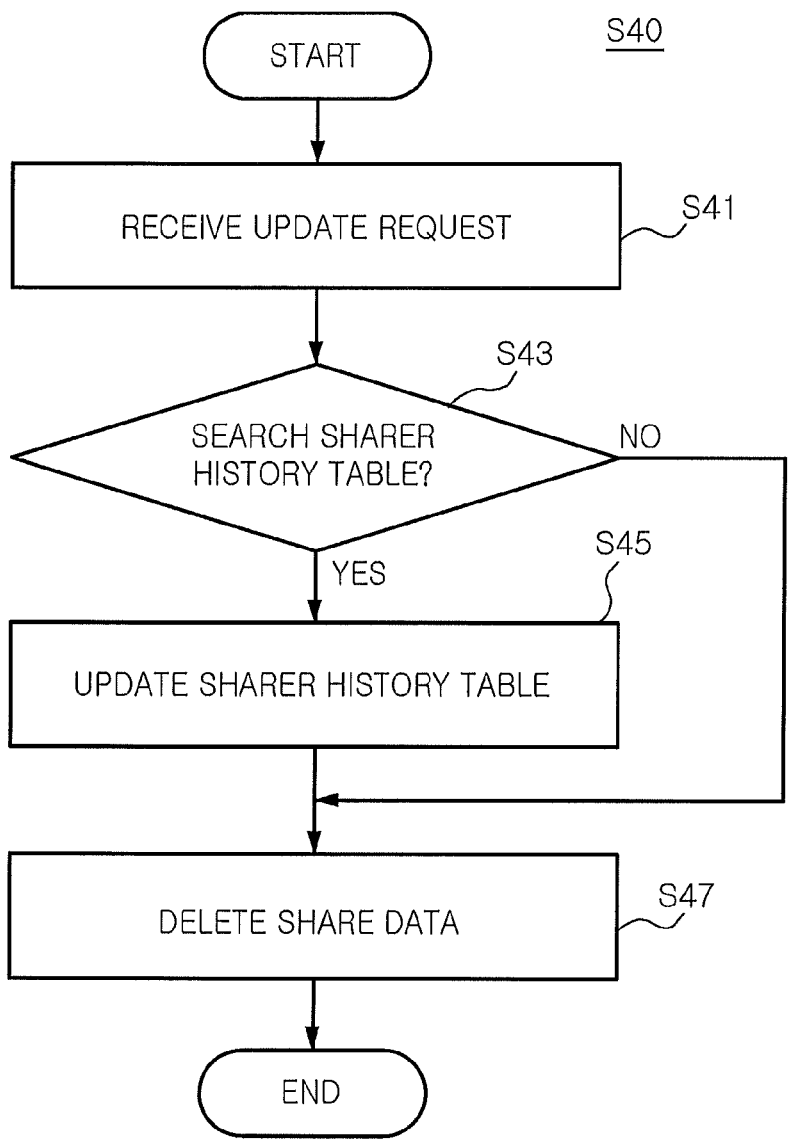

Referring to FIG. 9D, a history updating process S40 of the sharer history table in the cache coherence scheme according to the present invention may include a history update requesting operation S41, a sharer history table searching operation S43, a sharer history table updating operation S45, and a share data deleting operation S47.

In the history update requesting operation S41, when an invalidation request is received from a new sharer node N4, a history update request is made to update the sharer history table.

In the sharer history table searching operation S43, it is determined whether information about the share data is present in the sharer history table, in response to the history update request.

In the sharer history table updating operation S45, information about the corresponding share data is deleted if information about the share data is present in the sharer history table. Information about the share data to be deleted may include information about the address of the sharer node N3 storing the share data.

In the share data deleting operation S47, the share data are deleted from the cache or the distributed memory.

In the history updating process S40 of the sharer history table, the node N4 storing valid data may be continuously updated.

The above method for using/managing the sharer history table can reduce traffic generation, thus reducing a data access time delay. Also, the continuous management of the sharer history table of the auxiliary memory 160 is possible, thus making it possible to cope with an operation change of the processor.

As described above, according to the exemplary embodiments of the present invention, the network load reducing method and the node structure for a multiprocessor system with a distributed memory can reduce a data access time by reducing the traffic that is generated in the event of a data request failure.

While the present invention has been shown and described in connection with the exemplary embodiments, it will be apparent to those skilled in the art that modifications and variations can be made without departing from the spirit and scope of the invention as defined by the appended claims.

What is claimed is:

1. A network load reducing method using a multiprocessor system including a requester node having a distributed memory and an auxiliary memory storing a sharer history table, the network load reducing method comprising:
   recording the history of a sharer node in the sharer history table of the auxiliary memory;
   requesting share data with reference to the sharer history table of the auxiliary memory;
   deleting share data stored in the distributed memory and updating the sharer history table of the auxiliary memory; and
   updating the sharer history table, if there is a change in the sharer node information stored in the sharer history table of the auxiliary memory;
   wherein the updating of the sharer history table comprises:
   performing an update request operation of receiving an update request of the sharer history table of the requester node from a new sharer node storing share data;
   performing a history updating operation of changing information about a node storing the share data in the sharer history table to information about the new sharer node; and
   performing a data deleting operation of deleting the share data stored in the distributed memory.

2. The network load reducing method of claim 1, wherein the recording of the history of a sharer node in the sharer history table of the auxiliary memory comprises:
   determining, if a providing node of received share data is not a home node, that the providing node is the sharer node; and
   storing information about the sharer node and information about the share data in the sharer history table of the auxiliary memory.

3. The network load reducing method of claim 2, wherein the storing of the information about the sharer node and the information about the share data in the sharer history table of the auxiliary memory comprises:

determining whether there is free storage space available in the auxiliary memory;

deleting a history thereof according to a predetermined management standard if there is no free storage space available in the auxiliary memory; and storing the information about the sharer node and the information about the share data in the sharer history table of the auxiliary memory if there is free storage space available in the auxiliary memory or if the history is deleted.

4. The network load reducing method of claim 3, wherein the predetermined management standard is a first-in first-out (FIFO) scheme, a scheme of deleting information about share data in descending order of the oldness of the final search time, or a scheme of deleting information about share data in ascending order of the search frequency.

5. The network load reducing method of claim 1, wherein the requesting of the share data comprises:

searching whether the sharer history table includes information about share data to be requested from a home node;

performing a first request operation of requesting the share data from the home node, if the search fails; and performing a second request operation of requesting the share data from the sharer node storing the share data, if the search is successful.

6. The network load reducing method of claim 5, wherein the sharer history table stored in the auxiliary memory comprises share data and information about a sharer node storing the share data.

7. The network load reducing method of claim 5, wherein the node of the multiprocessor system further comprises a directory configured to store information about the home node, and the first request operation comprises:

reading the address of the home node, storing the share data, from the directory; and requesting the transmission of the share data from the home node.

8. The network load reducing method of claim 1, wherein the deleting of the share data stored in the distributed memory comprises:

searching whether the sharer history table of the auxiliary memory includes information about the share data, if the use of the share data is completed;

performing a first deletion operation of deleting the share data from the distributed memory, if the search fails; and performing a second deletion operation of deleting information about the share data to be deleted from the sharer history table of the auxiliary memory and deleting the share data from the distributed memory, if the search is successful.

9. The network load reducing method of claim 8, wherein the sharer history table stored in the auxiliary memory comprises share data and information about a sharer node storing the share data, and the information about the share data to be deleted from the sharer history table of the auxiliary memory in the second deletion operation further comprises information about the sharer node storing the share data.

10. The network load reducing method of claim 1, wherein the sharer history table stored in the auxiliary memory comprises share data and information about a sharer node storing the share data, and the history updating operation comprises:

searching whether there is information about the share data in the sharer history table; and changing the sharer node information corresponding to the share data in the sharer history table to the new sharer node information, if the search is successful.

11. A node comprising:

a processor configured to control the node and process data;

a distributed memory configured to store the data processed by the processor; and an auxiliary memory configured to store a sharer history table, wherein, if the node receives share data, which are requested from a first external node by the node, from a second external node, the sharer history table stores information about the second external node and information about the share data;

wherein the processor is configured to perform an updating of the sharer history table if the share data received from the second external node represents a change in sharer node information stored in the sharer history table of the auxiliary memory; and wherein the updating of the sharer history table comprises:

performing an update request operation of receiving an update request of the sharer history table of the node from a new sharer node storing share data;

performing a history updating operation of changing information about a node storing the share data in the sharer history table to information about the new sharer node; and performing a data deleting operation of deleting share data stored in the distributed memory.

12. The node of claim 11, further comprising:

a cache configured to store data that are read from the distributed memory and the first external node.

13. The node of claim 12, further comprising:

a directory configured to store information about the first external node if the node reads data from the first external node.

14. The node of claim 11, further comprising:

a communication unit configured to communicate data with at least one of the first external node and the second external node.

* * * * *